US011880854B2

(12) United States Patent
Bostick et al.

(10) Patent No.: US 11,880,854 B2
(45) Date of Patent: *Jan. 23, 2024

(54) REAL-TIME PRODUCT SELECTION GUIDANCE FOR CONDITIONAL SALES

(71) Applicant: Maplebear Inc., San Francisco, CA (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,797

(22) Filed: Nov. 12, 2021

(65) Prior Publication Data

US 2022/0067766 A1    Mar. 3, 2022

Related U.S. Application Data

(63) Continuation of application No. 16/543,210, filed on Aug. 16, 2019, now Pat. No. 11,195,196, which is a
(Continued)

(51) Int. Cl.
*G06Q 30/00* (2023.01)
*G06Q 30/0207* (2023.01)
(Continued)

(52) U.S. Cl.
CPC ..... *G06Q 30/0207* (2013.01); *G06Q 30/0269* (2013.01); *G06Q 30/0282* (2013.01); *G06V 10/22* (2022.01)

(58) Field of Classification Search
None
See application file for complete search history.

(56) References Cited

U.S. PATENT DOCUMENTS 7,707,073 B2    4/2010    Bloebaum et al.
8,249,928 B2    8/2012    Schuller et al.
(Continued)

FOREIGN PATENT DOCUMENTS

WO    WO 2015/023630 A1    2/2015

OTHER PUBLICATIONS

How to use the Sam's Club Scan & Go app, Nov. 16, 2016, StockPilingMoms.com (Year: 2016).*
(Continued)

*Primary Examiner* — Naresh Vig
(74) *Attorney, Agent, or Firm* — Fenwick & West LLP

(57) ABSTRACT

A valid combination of products is constructed from a set of products identified by a retailing backend system. The valid combination satisfies a condition of an offer. A product in the combination of product is a physical product located in a physical store. A social sentiment towards the product in social media data of a shopper is evaluated, and a rating of the product is computed using the evaluation. A location of the product in the store is obtained from the retailing backend system. The location of the product is overlaid on a view of the store, where the view is from a perspective of a location of the shopper, the shopper being physically situated in the store.

20 Claims, 7 Drawing Sheets

Related U.S. Application Data continuation of application No. 15/431,813, filed on Feb. 14, 2017, now Pat. No. 10,679,232.

(51) Int. Cl.
*G06Q 30/0282* (2023.01)
*G06Q 30/0251* (2023.01)
*G06V 10/22* (2022.01)

(56) References Cited

U.S. PATENT DOCUMENTS

| | | | |
|---|---|---|---|
| 8,606,634 B2 | 12/2013 | Porter et al. | |
| 8,756,092 B1 | 6/2014 | Martsen | |
| 9,898,742 B2 | 2/2018 | Higgins et al. | |
| 11,120,465 B1* | 9/2021 | Fei | G06Q 30/0225 |
| 2002/0065714 A1 | 5/2002 | Goodwin | |
| 2005/0049914 A1* | 3/2005 | Parish | G06Q 20/10 |
| | | | 705/39 |
| 2009/0299824 A1 | 12/2009 | Barnes | |
| 2010/0287103 A1 | 11/2010 | Mason | |
| 2011/0140380 A1* | 6/2011 | Ulrich | G06Q 30/0603 |
| | | | 280/33.992 |
| 2011/0145093 A1* | 6/2011 | Paradise | G06Q 30/02 |
| | | | 705/26.1 |
| 2013/0103539 A1 | 4/2013 | Abraham et al. | |
| 2013/0218721 A1* | 8/2013 | Borhan | G06Q 30/0238 |
| | | | 705/26.41 |
| 2014/0019300 A1* | 1/2014 | Sinclair | G06Q 30/0641 |
| | | | 705/26.9 |
| 2014/0095285 A1 | 4/2014 | Wadell et al. | |
| 2014/0156461 A1 | 6/2014 | Lerner | |
| 2014/0207570 A1* | 7/2014 | Cancro | G06Q 30/0261 |
| | | | 705/26.7 |
| 2014/0214547 A1 | 7/2014 | Signorelli et al. | |
| 2014/0337175 A1 | 11/2014 | Katzin et al. | |
| 2015/0073907 A1 | 3/2015 | Purves et al. | |
| 2015/0112789 A1 | 4/2015 | Yadati et al. | |
| 2015/0339709 A1 | 11/2015 | Otto et al. | |
| 2015/0348149 A1 | 12/2015 | Gudmundsson et al. | |
| 2016/0300392 A1 | 10/2016 | Jonczyk et al. | |
| 2018/0150869 A1* | 5/2018 | Finnegan | G06Q 30/0239 |

OTHER PUBLICATIONS

Christine Kern, Sam's Club extends Scan-And-Go mobile checkout services to all stores, Sep. 27, 2016, RetailSupplyChainInsights.com (Year: 2016).*
List of all IBM related dockets. Appendix P. 2019, pp. 1-2.
Siber, V et al., "Claiming Computer-Related Inventions as Articles of Manufacture", The Journal of Law and Technology, 1994, pp. 1-23.
United States Office Action, U.S. Appl. No. 15/431,813, filed Sep. 26, 2019, 12 pages.
United States Office Action, U.S. Appl. No. 15/431,813, filed Dec. 20, 2018, 14 pages.
United States Office Action, U.S. Appl. No. 16/543,210, filed Nov. 12, 2020, eight pages.

* cited by examiner

US 11,880,854 B2

REAL-TIME PRODUCT SELECTION GUIDANCE FOR CONDITIONAL SALES

CROSS REFERENCE TO RELATED APPLICATIONS

This application is a continuation of U.S. application Ser. No. 16/543,210, filed Aug. 16, 2019, which is a continuation of U.S. application Ser. No. 15/431,813, filed Feb. 14, 2017, now U.S. Pat. No. 10,679,232, each of which is incorporated by reference in its entirety.

TECHNICAL FIELD

The present invention relates generally to a method, system, and computer program product for enabling shoppers to select products that satisfy current sale offers and promotions. More particularly, the present invention relates to a method, system, and computer program product for real-time product selection guidance for conditional sales.

BACKGROUND

A real-time operation, also referred to as a near-real-time operation, is an operation that occurs as close as possible in time to a related event or another operation, within the constraints of technological limitations. A real-time component, also referred to as a near-real-time component, is a component that performs a real-time operation.

Hereinafter, a "product" or an "item" is a physical item made available for sale to a shopper (user) in a physical brick-and-mortar store by a seller, unless express distinguished where used. A reference herein to a "store" is a reference to a brick-and-mortar physical store. Hereinafter, a reference to a retailer is a reference to a seller of any kind without drawing a distinction between sellers operating a retail store or a wholesale store.

A shopping cart, or "cart," is a reference to a physical shopping cart in which a shopper collects products in a store. An "offer" or "promotion" is an advertisement to sell one or more products at a discount or with an additional benefit. The terms and conditions, or "T&C" of an offer are one or more conditions that a user's planned purchase has to satisfy in order to qualify for the offer, get an advertised benefit of the offer, or both.

Sellers often advertise offers which require shoppers to purchase certain combinations of certain products in order to get the benefit of the advertised offer. For example, an offer might be applicable when the shopper buys one item of brand X and another item of brand Y together. If the shopper instead buys two items of brand X the offer does not apply. If the shopper instead buys an item of brand X and an item of brand Z, the offer does not apply.

Similarly, another example offer might be applicable when the shopper buys a specific type of item of brand X and a specific type of item of brand Y or Z in the same purchase. If the shopper instead buys an item of brand X but of a different type during a shopping session, the offer does not apply. Different combinations of types and/or brands also disqualify the purchase from the offer.

Similarly, another example offer might be applicable when the shopper buys three items of brand X in the same purchase. If the shopper instead buys only two items of brand X during a shopping session, the offer does not apply.

SUMMARY

The illustrative embodiments provide a method, system, and computer program product. An embodiment includes a method that constructs, using a processor and a memory, and from a set of products identified by a retailing backend system, a valid combination of products, the valid combination satisfying a condition of an offer, wherein a product in the combination of product is a physical product located in a physical store. The embodiment computes, by evaluating a social sentiment towards the product in social media data of a shopper, a rating of the product. The embodiment obtains, from the retailing backend system, a location of the product in the store. The embodiment overlays the location of the product on a view of the store, wherein the view is from a perspective of a location of the shopper, the shopper being physically situated in the store.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
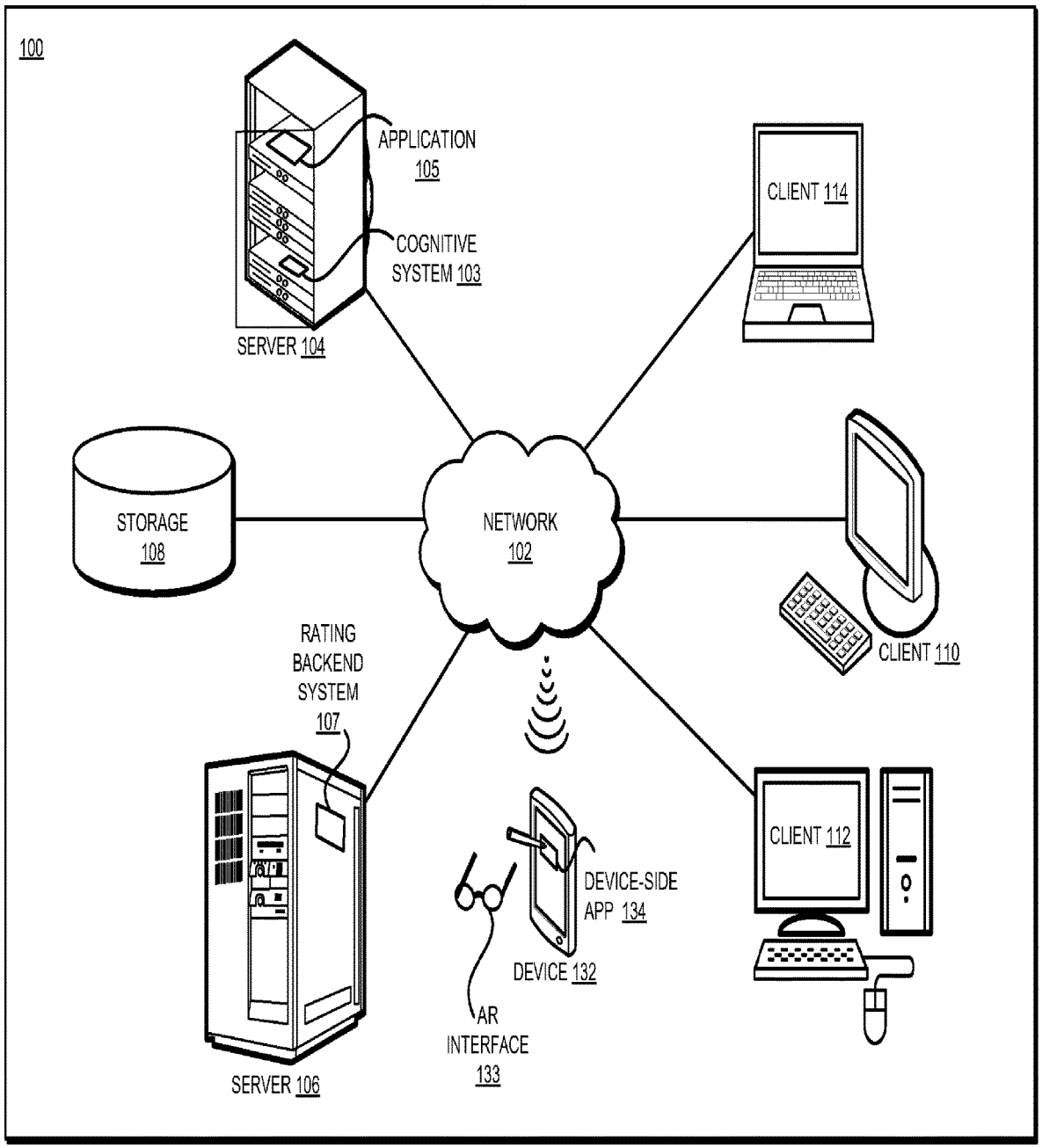
FIG. 1 depicts a block diagram of a network of data processing systems in which illustrative embodiments may be implemented.

The illustrative embodiments recognize that the T&C of offers can be complex, stores can be vast, the number of products can be overwhelming, choices available for a given product can be confusing, or some combination of these and other similar problems exist for a shopper trying to shop for a product. In some cases, the shopper simply does not understand the T&C and fails to qualify for the offer due to the lack of understanding. In some other cases, the shopper cannot find a product required by an offer. In some other cases, the shopper simply misses the offer completely and remains unaware that an offer is available to the shopper.

These and many other shopping circumstances prevent offers to be effective to the advantage of shoppers, the retailer, or both. A shopper might either forego buying a product, might return a product, might realize too late that they could have taken additional actions to qualify for an offer, and the like. As a result, a retailer might lose a sale, incur a loss due to a returned product, and generally lose the intended advantage from advertising the offer.

The illustrative embodiments recognize that the presently available tools or solutions do not address these needs or provide adequate solutions for these needs. The illustrative embodiments used to describe the invention generally address and solve the above-described problems and other problems related to real-time product selection guidance for conditional sales.

An embodiment can be implemented as a software application. The application implementing an embodiment can be configured as a modification of an existing retailing backend system, as a separate application that operates in conjunction with an existing retailing backend system, a standalone application, or some combination thereof.

One set of embodiments is configured to assist a shopper starting with the advertised offers. For example, either prior to the shopper reaching the store for a shopping session, or when the shopper is present at the store, an embodiment receives one or more offer inputs.

An offer input is a manner of capturing the advertisement of an offer. For example, the offer may be advertised on a printed flyer, from which the offer input is captured in the form of a picture or image of all or a portion of the flyer. The offer input captured in this manner may be a picture of plain text, barcodes, encoded image such as QR codes, and the like, or some combination thereof. As another example, the offer may be advertised using a radio frequency identification (RFID) device, from which the offer input is captured in the form of a RFID identifier. It is possible to capture and use the offer input in multiple forms—such as the picture form as well as the RFID form.

An embodiment analyzes the offer input to determine an offer identifier. For example, the offer identifier may be a textual code obtained from image analysis of textual data, decoded identifier from image analysis of a barcode or encoded image, identifier unpacked from the RFID transmission, or some combination thereof. One embodiment uses an external cognitive engine for performing a suitable analysis of the offer input and producing an offer identifier output. The cognitive system may be a standalone system or a part of a retailing backend system.

Once an offer identifier is obtained, an embodiment queries a retailing backend system of the store associated with the offer. Particularly, the query provides the retailing backend system the offer identifier and obtains a result set which includes the identifiers of one or more products that can potentially satisfy the offer.

In one embodiment, the product identifiers appear in one or more pre-arranged valid combinations with one another such that any of the one or more combinations is sufficient to satisfy the offer T&C. A valid combination is a combination of one or more products that satisfies the T&C of an offer.

In another embodiment, the cognitive system is used to analyze the offer input to further determine the one or more valid combinations. The embodiment then constructs the one or more combinations using the product identifiers received in the result set, and by referencing a product catalog.

For one or more products in a valid combination, one embodiment further determines whether the shopper's social network has expressed a social sentiment towards the product. A social network comprises a set of other users or subscribers of a social media platform. A social sentiment towards a product is social media data that is indicative of a like or dislike of the product by a member of the social network.

To evaluate the social sentiment towards a product in a valid combination, an embodiment collects the shopper's social media data from the shopper's social media platform. Using existing social sentiment analysis techniques, the embodiment evaluates a social sentiment expressed towards the product in the social media data of the shopper. For example, a social media friend of the shopper may have expressed a favorable experience with the product, or written a bad review of the product, type of product, manufacturer of the product, etc.

Using the social sentiment corresponding to a product, an embodiment computes and assigns the product a social sentiment rating (interchangeably referred to simply as a product "rating"). A shopper may set a preferred product rating or an embodiment may be configured with a default social sentiment rating. As a non-limiting example, if the computed rating is on an example scale of 1-10 with 10 being the highest, the default rating may be set to 5, or a shopper-specified rating threshold may be 7. An embodiment selects those valid combinations in which each participant product has the default or shopper-specified rating, as the case may be.

An embodiment further assists the shopper with locating a product that participates in a valid combination. For example, the result set may already include a location of the product with the product identifier of a product. The location may be an aisle and rack position within the store layout, a set of coordinates, or some other suitable manner of describing the location of the product within the store.

Using the location of the product, an embodiment visualizes the store layout for the user and superimposes on the visualization the location of the product in a suitable manner. For example, in an augmented reality (AR) capability available on the shopper's device or peripheral, the embodiment can present a view of the store from the shopper's current perspective and graphically or textually overlay in the view the location of the product. An embodiment can be further configured to visually represent a product rating in the visualization of the product location.

Another set of embodiments is configured to assist a shopper starting with a product that the shopper selects. For example, an embodiment receives one or more product inputs.

A product input is a manner of capturing information about the product. For example, the product input may be captured in the form of a picture or image of all or a portion of the product. The product input captured in this manner may be a picture of the product itself, plain text, barcodes, encoded image such as QR codes, and the like, or some combination thereof, present on the product. As another example, the product may have an RFID device associated therewith, from which the product input is captured in the form of a RFID identifier. It is possible to capture and use the product input in multiple forms—such as the picture form as well as the RFID form.

An embodiment analyzes the product input to determine a product identifier. For example, the product identifier may be a textual code obtained from image analysis of textual data, decoded identifier from image analysis of a barcode or encoded image, identifier unpacked from the RFID transmission, or some combination thereof. One embodiment uses an external cognitive engine for performing a suitable analysis of the product input and producing an offer identifier output. The cognitive system may be a standalone system or a part of a retailing backend system.

Once a product identifier is obtained, an embodiment queries a retailing backend system with the product identifier to determine whether any offers are associated with the product. Particularly, the query provides the retailing backend system the product identifier and obtains a result set which includes the identifiers of one or more offers in which the product appears in a valid combination.

In some cases, the product may not be participating in any offers. In such cases an embodiment can be configured to alert the shopper than no offers are applicable to the product being considered.

When one or more offers are associated with the product, an embodiment proceeds with an offer identifier in a manner described herein. For example, the embodiment obtains from the retailing backend system a result set of products that can potentially satisfy the offer; produces valid combinations of the product and other products from the result set; computes product ratings of the product, the other product, or both, in a valid combination; locates the other product; visualizes the location and/or the rating of the other product; or performs some combination of these and other functions with respect to an offer, as described herein.

Another set of embodiments is configured to assist a shopper starting with a set of products that the shopper has placed in a shopping cart. Assume that the shopping cart is enabled with technology to determine which physical products are physically placed in the physical shopping cart. For example, a barcode scanner coupled with the cart may scan a product as the product is placed in the cart. As another example, an RFID reader may read an RFID tag associated with a product that is placed in the cart.

These examples manners of capturing product input about the products present in the cart are not intended to be limiting. From this disclosure, those of ordinary skill in the art will be able to conceive many other manners of capturing product input about the products present in the cart and the same are contemplated within the scope of the illustrative embodiments.

An embodiment configures the cart such that the cart can share the product inputs captured by the cart with the embodiment. For example, an embodiment receives one or more product inputs from a cart configured in such a manner.

An embodiment analyzes the product input to determine a product identifier. Once a product identifier is obtained, an embodiment queries a retailing backend system with the product identifier to determine whether any offers are associated with the product.

In some cases, the product may not be participating in any offers. In such cases the embodiment repeats the process of similarly determining whether offers are available for other products in the cart until no product remains unexplored in this manner. A shopper can be alerted when no offers are applicable to any of the products in the cart.

When one or more offers are associated with the product, an embodiment proceeds with an offer identifier in a manner described herein. For example, the embodiment obtains from the retailing backend system a result set of products that can potentially satisfy the offer; and produces valid combinations of the product and other products from the result set.

The embodiment determines if a valid combination is completely present in the cart. Optionally, the embodiment can be configured to notify the user about complete valid combinations being present in the cart; compute product ratings of the participating products in a valid combination; visualize the ratings; or perform some combination of these and other functions with respect to an offer, as described herein.

If a valid combination is not completely present in the cart, i.e., not all of the required products of a valid combination are present in the cart, an embodiment produces valid combinations from a product in the cart and one or more other products identified in the result set but are not present in the cart. The embodiment computes product ratings of the other product; locates the other product; visualizes the location and/or the rating of the other product; or performs some combination of these and other functions with respect to a valid combination, as described herein.

In some cases, a shopper may have preset preferences for products, a present budget for a shopping session, or both. For example, the shopper may have a profile where the shopper has specified product preferences, such as brands, sizes, colors, textures, materials, price-ranges, styles, and/or other descriptors of one or more products that the shopper prefers. The shopper can similarly configure a budget that applies generally to shopping sessions of a type, or to a specific session.

Prior to the shopper reaching the store for a shopping session, or when the shopper is present at the store, an embodiment receives such a profile of the shopper. The embodiment receives one or more offer inputs, e.g., by capturing offer inputs in one or more manners described herein, or by communicating with a retailing backend system to obtain one or more offer identifiers.

When an offer is available, the embodiment obtains from the retailing backend system a result set of products that can potentially satisfy the offer. The embodiment discards from the result set those products that do not satisfy the shopper's product preferences, budget, or both. From the remaining subset of products, the embodiment produces valid combinations of products such that all or at least a threshold number of products in the valid combination satisfy the product preferences, and the valid combination as a whole satisfies the optionally specified budget together with other products being contemplated for purchase during the session.

An embodiment further computes product ratings of a product in a valid combination; locates the product; visualizes the location and/or the rating of the product; or performs some combination of these and other functions with respect to a product, as described herein.

The manner of real-time product selection guidance for conditional sales described herein is unavailable in the presently available methods. A method of an embodiment described herein, when implemented to execute on a device or data processing system, comprises substantial advancement of the functionality of that device or data processing system in assisting a shopper in selecting products for purchasing, such that any applicable offers are satisfied, missing or needed products for a valid combination are located, a product is rated, a product preference is satisfied, a budget is not exceeded, or some combination thereof.

The illustrative embodiments are described with respect to certain types of products, inputs, identifiers, offers, combinations, social sentiments, ratings, locations, visualizations, preferences, interfaces, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
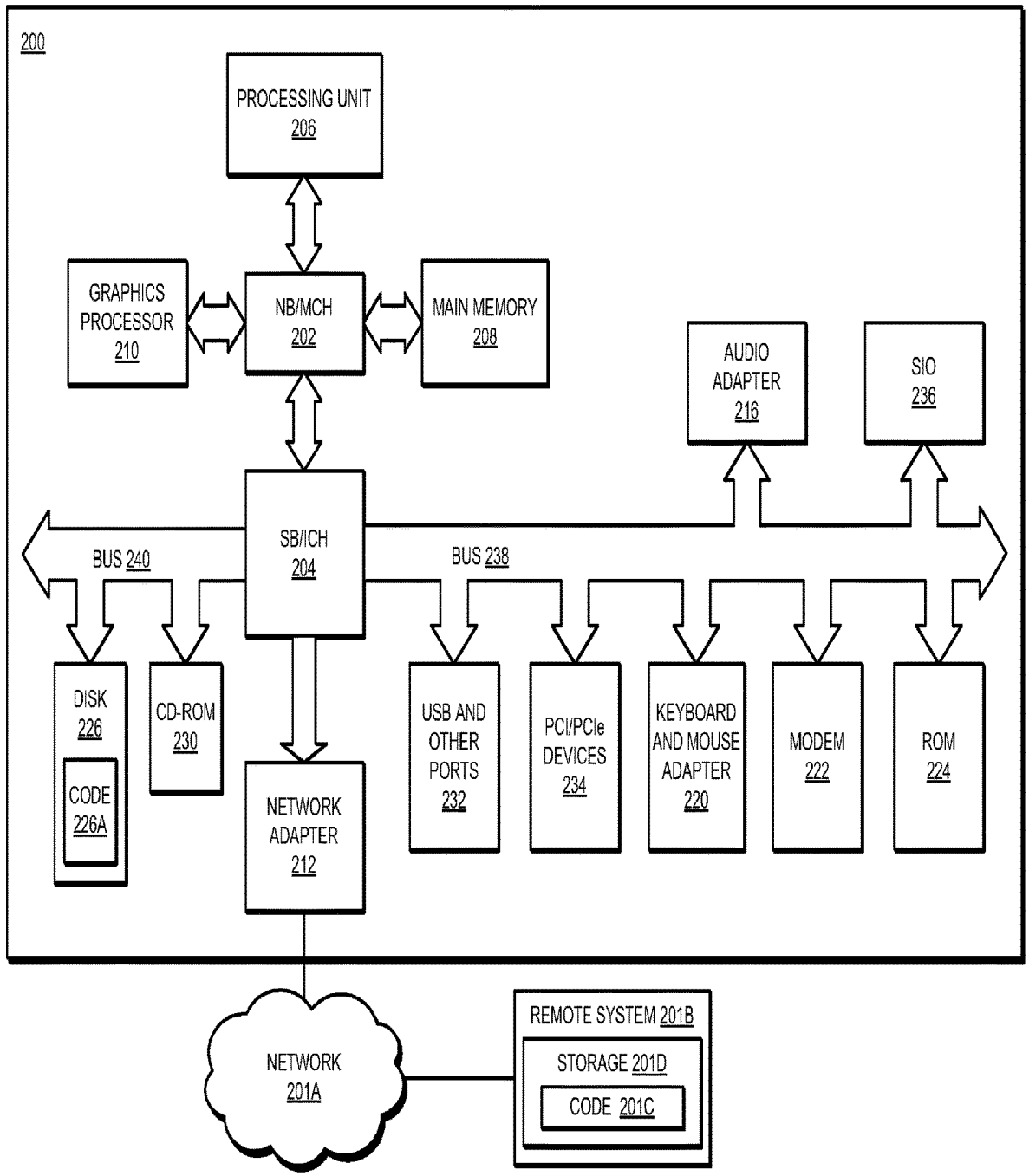
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 operates in conjunction with device-side app (app) 134 executing in a shopper's portable device. Optionally, device 132 may be configured with a peripheral, such as an AR interface device 133, which may be a wearable device conforming to the characteristics of an eyewear accessory and usable to capture offer input and/or product input as described herein. Device 132 may itself be configured with sensors, such as a camera (not shown) or an RFID reader (not shown), to capture offer input and/or product input. App 134 captures an input and sends to application 105. Application 105 optionally uses cognitive system 103 to compute offer identifier, product identifier, or both, as described herein. Application 105 queries retailing backend system 107 in a manner described herein. Application 105 provides product rating information, product location information, optionally in visualized form, to app 134. When visualization is provided, device 132 or AR interface 133 may present such visualization to the shopper.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and app 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
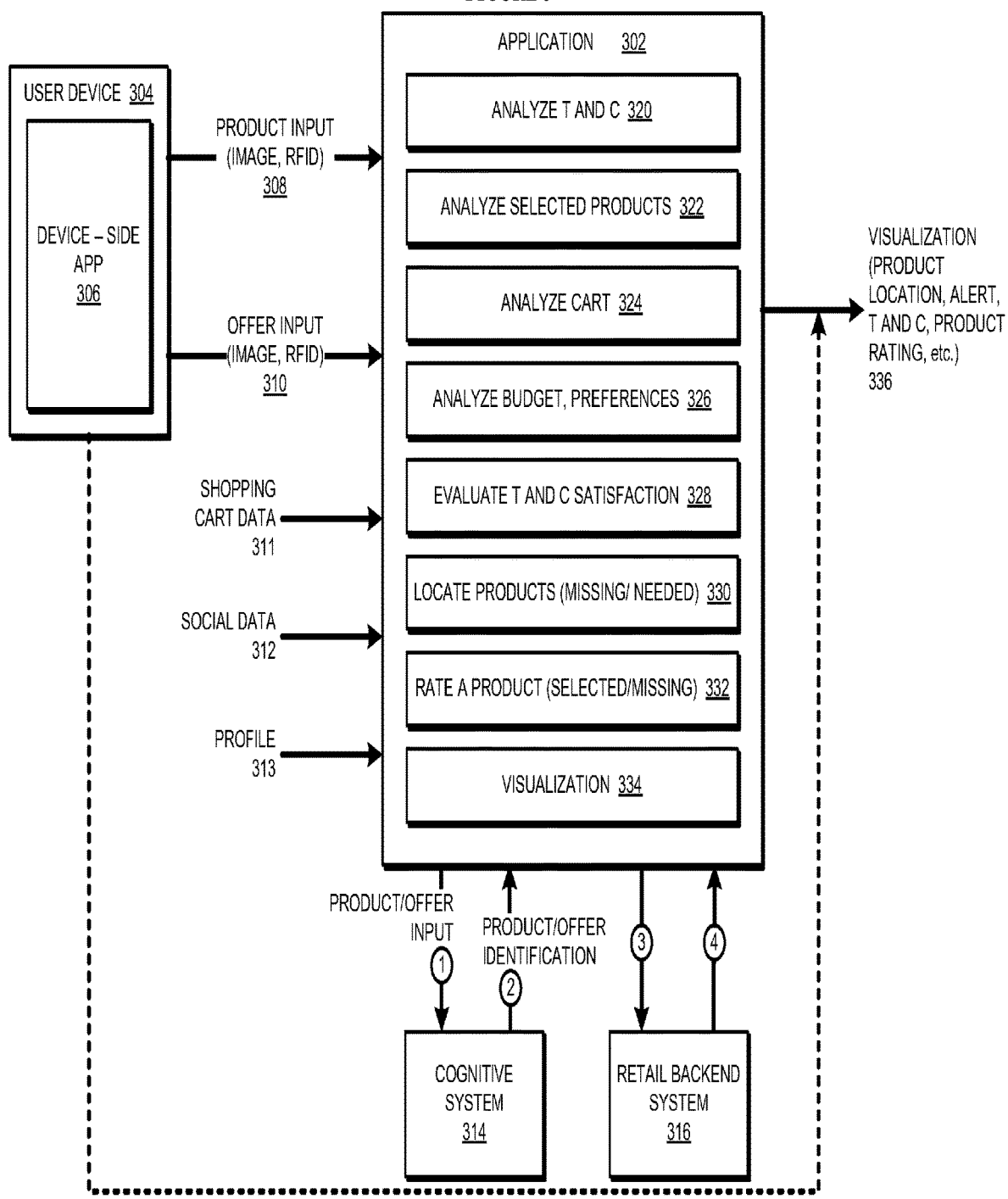
FIG. 3 depicts a block diagram of an example configuration for real-time product selection guidance for conditional sales in accordance with an illustrative embodiment.

With reference to FIG. 3, this figure depicts a block diagram of an example configuration for real-time product selection guidance for conditional sales in accordance with an illustrative embodiment. Application 302 is an example of application 105 in FIG. 1. User device 304 is an example of some combination of device 132 and AR interface 133 in FIG. 1. Device-side app 306 is an example of app 134 in FIG. 1.

Product input 308 is captured as described herein, e.g., as an image or an RFID transmission, and serves as an input to application 302. Offer input 310 is captured as described herein, e.g., as an image or an RFID transmission, and serves as another input to application 302.

A shopping cart that is enabled to detect products placed in the cart and to interact with application 302, provides shopping cart data 311 comprising product identifiers or product inputs, as the cart may be enabled to sense. Social data 312 is sourced from a social media platform, and serves as another input to application 302 in the computation of social sentiment-based ratings of various products, as described herein. Profile 313 provides shopper's product preferences and/or budget information to application 302.

Cognitive system 314 is an example of cognitive system 103 in FIG. 1, and is optionally used by application 302 in a manner described herein. Retailing backend system 316 is an example of retailing backend system 107 in FIG. 1.

When an offer is selected or detected prior to or during a shopping session, and offer input 308 is received, component 320 sends offer input 310 to cognitive system 314 in request "1" and obtains an offer identification in response "2" from cognitive system 314.

Component 320 sends a query in request "3" to retailing backend system 316 and obtains the T&C applicable to the offer identifier in response "4" from retailing backend system 316. Component 320 sends further queries retailing backend system 316 product identifiers that satisfy the T&C of an offer. Component 320 either received a valid combination of the product identifiers from retailing backend system 316, depending on the implementation of retailing backend system 316, or constructs a valid combination to satisfy the T&C of an offer, or both.

When a product is selected by the shopper during a shopping session, and product input 308 is received, component 322 sends product input 310 to cognitive system 314 in request "1" and obtains a product identification in response "2" from cognitive system 314. Using an operation of component 320, component 322 determines whether the selected product satisfies the T&C of an offer.

When a shopping cart is enabled to interact with application 302, and cart data 311 is received, component 324 interacts with cognitive system 314 using request 1 and response 2 if product inputs are contained in data 311. When component 324 obtains product identifiers either in data 311 or from cognitive system 314, component 324 uses the operation of component 320 to determine whether valid combinations are present in the cart according to data 311.

When the shopper has specified profile 313, component 326 (i) uses an operation of component 320 and analyzes whether any current offers have any valid combinations that satisfy profile 313, (ii) uses an operation of component 320 and 322 to determine whether a product selected by the user has any offers applicable to it and satisfies profile 313, (iii) uses an operation of component 324 and determines whether a product in the cart satisfies profile 313, (iv) or some combination of i, ii, and iii.

Component 328 performs the evaluation of whether a given product or product combination satisfies the T&C of a given offer, and is therefore a valid combination. This operation is used by components 320-326 in their operations described herein. Component 328 identifies a product that is missing from a combination and is therefore preventing the combination from being a valid combination, or is otherwise needed to satisfy the T&C of an offer.

Component 330 locates a missing or needed product using the product information supplied by retailing backend system 316 in response 4. The product location information may be supplied automatically with a product identifier, or component 330 may query retailing backend system 316 with a product identifier to obtain the product's location in the store. Retailing backend system 316 also provides a store layout in a suitable form and format relative to which component 330 resolves the product location data into a physical location of the product in the store.

Component 332 uses social data 312 to compute a product rating for a product that is already selected, or a product that is missing from a combination to satisfy an offer. Component 334 generates visualization 336 from the outputs of components 328, 330, 332, or some combination thereof.

For example, visualization 336 may produce a visual display on device 304 or on an AR interface associated with device 304, where the visual display visually provides guidance to a product location e.g. by overlaying a store layout or live view of the store with pointers or guidance graphics towards the product location. Visualization 336 can also include alerts about missing products, needed products, failure of a selected product to satisfy an offer, and the like. Visualization 336 may also be configured to provide the user some or all of the T&C of an offer being evaluated, a product rating, and many other types of information.

Figure 4:
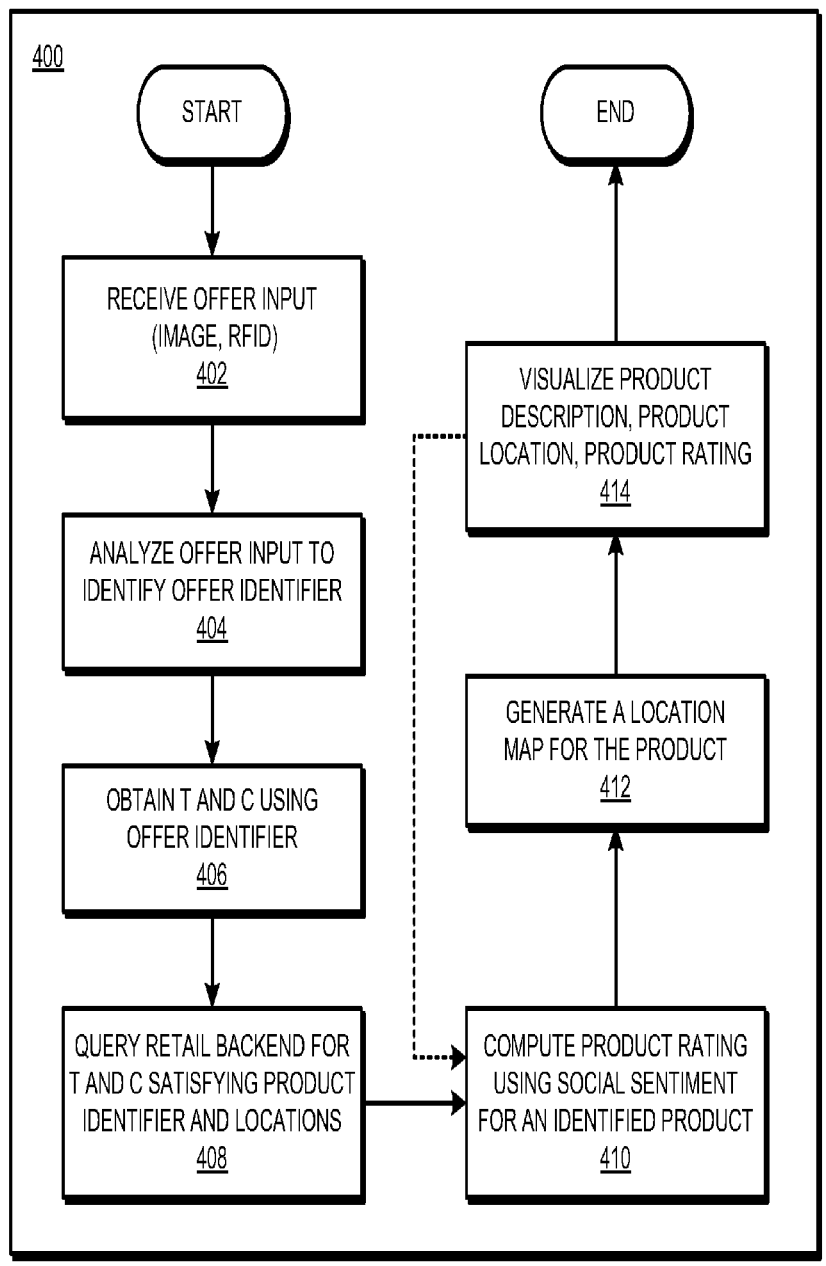
FIG. 4 depicts a flowchart of an example process for real-time product selection guidance for conditional sales in accordance with an illustrative embodiment.

With reference to FIG. 4, this figure depicts a flowchart of an example process for real-time product selection guidance for conditional sales in accordance with an illustrative embodiment. Process 400 can be implemented using application 302 in FIG. 3.

The application receives an offer input (block 402). The application analyzes the offer input to determine an offer identifier (block 404). The application obtains the T&C of the offer using the offer identifier (block 406).

The application queries a retailing backend system for products that satisfy the T&C, and the locations of those products (block 408). The application computes a product rating for a product whose information is obtained in block 408 (block 410). The application generates a location map of the product, i.e., a visualization of the product's location (block 412). The application presents the visualization (block 414). Any number of products can be evaluated and any number of offers can be evaluated in this manner.

The application ends process 400 thereafter. The application can also add to the visualization of block 414 the product description, rating, and many other types of product or offer-related data.

Figure 5:
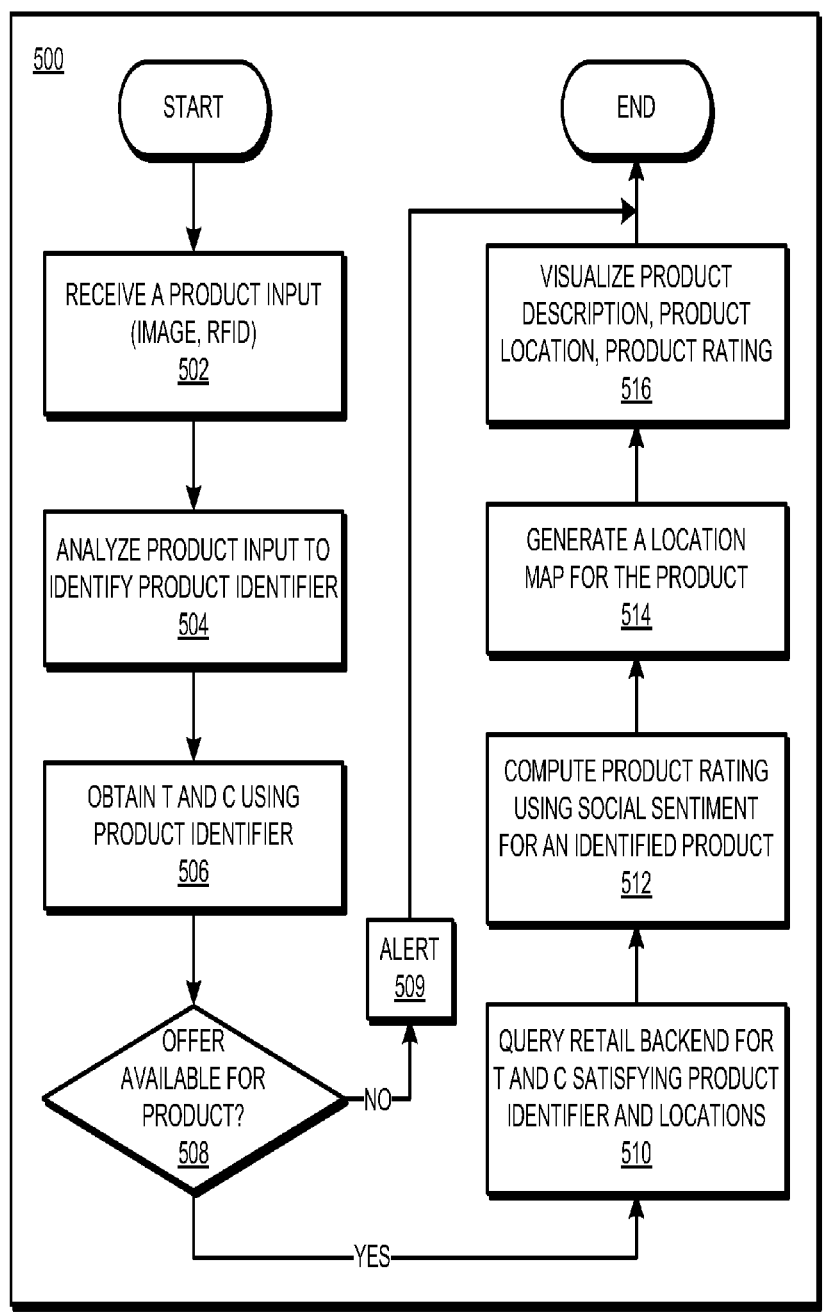
FIG. 5 depicts a flowchart of another process for real-time product selection guidance for conditional sales in accordance with an illustrative embodiment.

With reference to FIG. 5, this figure depicts a flowchart of another process for real-time product selection guidance for conditional sales in accordance with an illustrative embodiment. Process 500 can be implemented using application 302 in FIG. 3.

The application receives a product input (block 502). The application analyzes the product input to determine a product identifier (block 504). Using the product identifier, the application obtains the T&C of an offer that is applicable to the product (block 506).

The application determines whether an offer is found to be applicable to the product (block 508). If no offers are applicable to the product ("No" path of block 508), the application generates an alert for the shopper (block 509). The application ends process 500 thereafter.

If an offer is found ("Yes" path of block 508), the application queries a retailing backend system for other products that can be combined with the product to satisfy the T&C of the found offer, and the locations of such other products (block 510). The application computes a product rating for a product whose information is obtained in block 510 (block 512). The application generates a location map of the product, i.e., a visualization of the product's location (block 514). The application presents the visualization (block 516). The application ends process 500 thereafter. The application can also add to the visualization of block 516 the product description, rating, and many other types of product or offer-related data.

Figure 6:
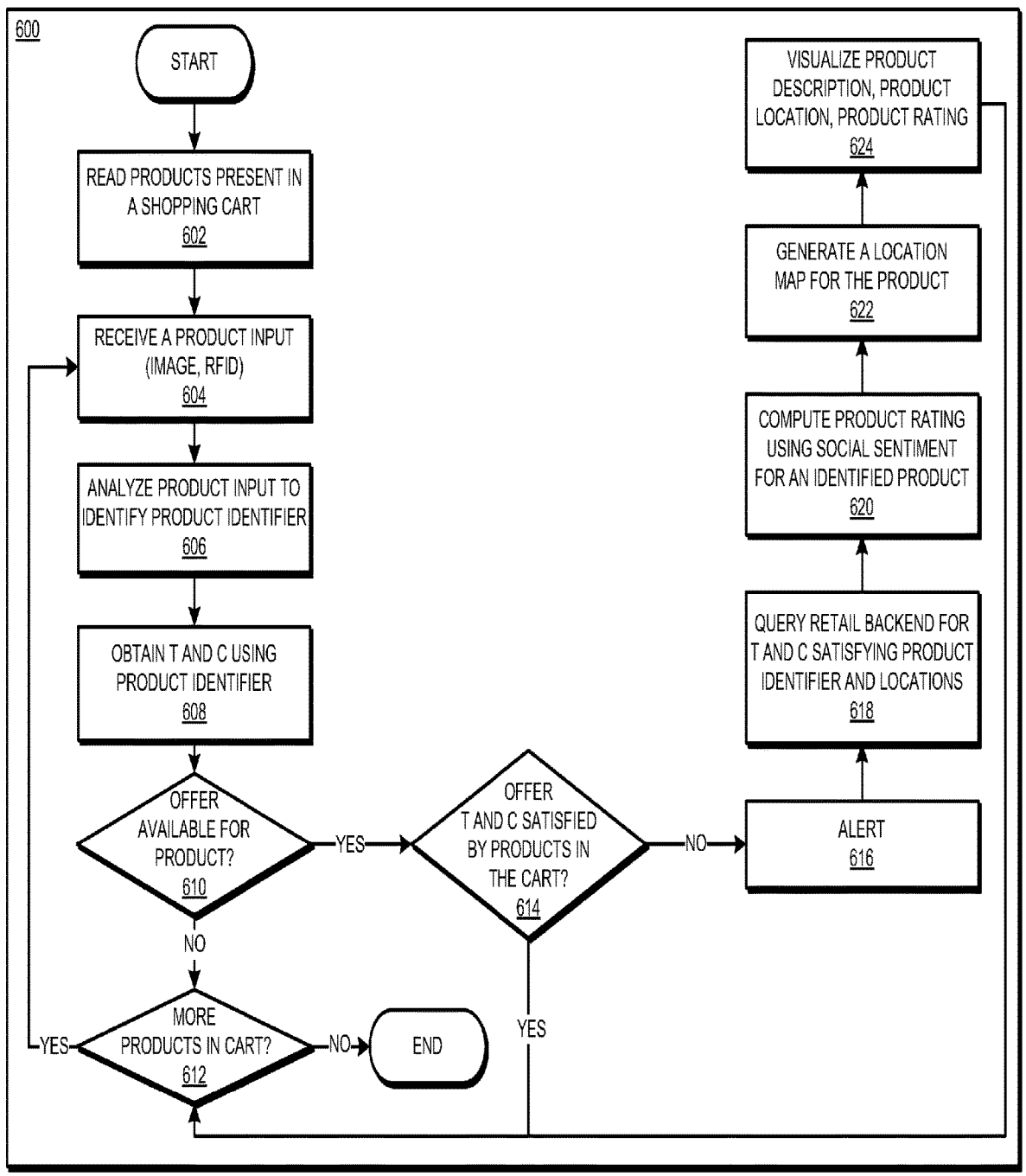
FIG. 6 depicts a flowchart of another process for real-time product selection guidance for conditional sales in accordance with an illustrative embodiment.

With reference to FIG. 6, this figure depicts a flowchart of another process for real-time product selection guidance for conditional sales in accordance with an illustrative embodiment. Process 600 can be implemented using application 302 in FIG. 3.

The application causes a shopping cart to read the products present in the cart (block 602). The application receives a product input from such a reading (block 604). The application analyzes the product input to determine a product identifier (block 606). Using the product identifier, the application obtains the T&C of an offer that is applicable to the product (block 608).

The application determines whether an offer is found to be applicable to the product (block 610). If no offers are applicable to the product ("No" path of block 610), the application determines if more products are present in the cart (block 612). If more products are present ("Yes" path of block 612), the application returns process 600 to block 604 to process more products in the cart. If no more products are present in the cart ("No" path of block 612), the application ends process 600 thereafter.

If an offer is available for the product ("Yes" path of block 610), the application determines whether the T&C of the offer are satisfied by the products that are present in the cart (block 614). If the T&C of the offer are satisfied by the products in the cart ("Yes" path of block 614), the application returns to block 612.

If the products in the cart do not satisfy the T&C of the offer applicable to the product ("No" path of block 614), the application outputs an alert to the shopper (block 616). The application queries a retailing backend system for other products that can be combined with the product to satisfy the T&C of the found offer, and the locations of such other products (block 618). The application computes a product rating for a product whose information is obtained in block 618 (block 620).

The application generates a location map of the product, i.e., a visualization of the product's location (block 622). The application presents the visualization (block 624). The application then returns to block 612. The application can also add to the visualization of block 624 the product description, rating, and many other types of product or offer-related data.

Figure 7:
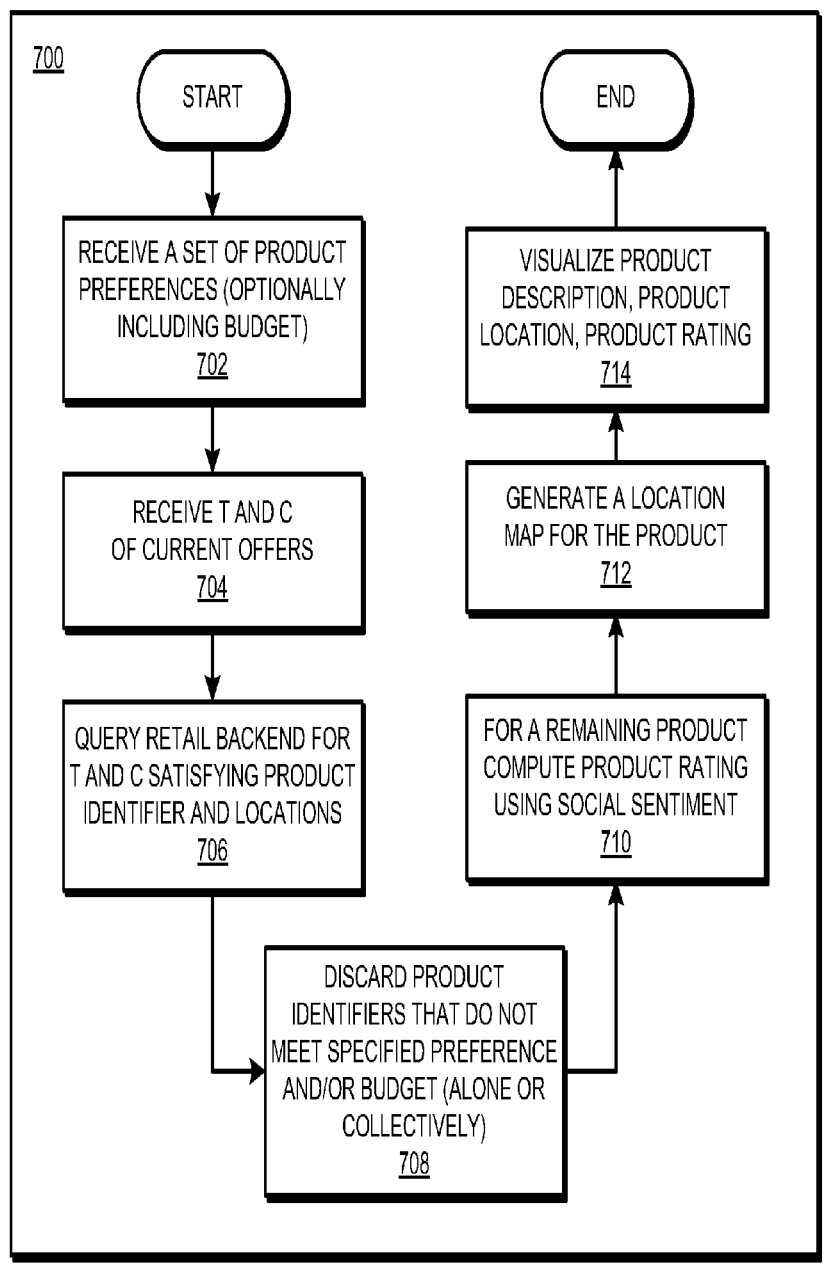
FIG. 7 depicts a flowchart of another example process for real-time product selection guidance for conditional sales in accordance with an illustrative embodiment.

With reference to FIG. 7, this figure depicts a flowchart of another example process for real-time product selection guidance for conditional sales in accordance with an illustrative embodiment. Process 700 can be implemented using application 302 in FIG. 3.

The application receives a set of product preferences, wherein one of the preference can be a budget for a shopping session or a type of shopping (block 702). The application obtains the T&C of the current offers available in the store, such as by querying a retailing backend system (block 704).

The application queries the retailing backend system for products that satisfy the T&C of one or more offers, and the locations of those products (block 706). The application discards or otherwise disregards those products that do not meet a product preference either alone or in combination with another product in forming a valid combination (block 708). For a remaining product, the application computes a product rating using social sentiment (block 710). The application generates a location map of the product, i.e., a visualization of the product's location (block 712). The application presents the visualization (block 714). Any number of products can be evaluated and any number of offers can be evaluated in this manner.

The application ends process 700 thereafter. The application can also add to the visualization of block 714 the product description, rating, and many other types of product or offer-related data.

Thus, a computer implemented method, system or apparatus, and computer program product are provided in the illustrative embodiments for real-time product selection guidance for conditional sales and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

scanning, by a sensor associated with a physical shopping cart, a first physical product placed in the physical shopping cart, the sensor in communication with a data processing apparatus associated with the physical shopping cart, the physical shopping cart located in a physical store;

identifying a first product identifier of the scanned first physical product;

querying a backend system with the product identifier, where the backend system stores an offer for a valid combination of products, the offer being available based on a condition of the physical store that requires the valid combination of products to be checked out together, the valid combination of products including the first physical product and at least a second physical product;

receiving, from the backend system in response to the querying, a second product identifier of the second physical product and an indication that the first physical product and the second physical product are included in the offer according to the condition that both the first physical product and the second physical product are to be checked out together;

causing the data processing apparatus coupled to the physical shopping cart to determine whether the second physical product has been scanned in the physical shopping cart;

responsive to determining that the second physical product has not been scanned in the physical shopping cart, obtaining a location of the second physical product in the physical store; and displaying information about the second physical product and information about the location of the second physical product in the physical store on a display device to a shopper using the shopping cart, the shopper being physically situated in the physical store.

2. The method of claim 1, wherein identifying the first product identifier of the scanned first physical product comprises:

capturing, from the first physical product, a product input, the product input comprising an image of the first physical product; and analyzing the image to extract the first product identifier of the first physical product.

3. The method of claim 1, wherein identifying the first product identifier of the scanned first physical product comprises:

capturing, from the first physical product, a product input, the product input comprising a transmission from a radio frequency identification (RFID) device associated with the first physical product; and analyzing the transmission to extract the first product identifier.

4. The method of claim 3, further comprising:

receiving, from a physical shopping cart, the product input corresponding to the first physical product, wherein the shopping cart is configured to identify products placed in the shopping cart, and wherein the selected product is physically placed in the shopping cart.

5. The method of claim 1, further comprising:

determining a product preference of the shopper from a profile of the shopper;

querying a retailing backend system for information about a superset of products that are participating in a set of current offers; and disqualifying, from the superset of products, those products that fail to satisfy the product preference, the set of products remaining after the disregarding.

6. The method of claim 5, further comprising:

determining that a first product in the superset and a second product in the superset form a first valid combination corresponding to the offer;

computing a combined characteristic of the first valid combination; and evaluating, as a part of the disqualifying, that the combined characteristic as failing to satisfy the condition.

7. The method of claim 6, wherein a value of the combined characteristic exceeds a budget set in the product preference.

8. The method of claim 1, further comprising:

detecting, using a second sensor, a presence of the shopper within the physical store; and establishing, responsive to the detecting, a communication path between the display device and a retailing backend system.

9. The method of claim 1, further comprising:

obtaining a layout of the store, wherein the displayed information about the location of the second physical product in the physical store comprises the layout of the store.

10. The method of claim 1, further comprising:

capturing an offer input, the offer input comprising an image of a printed flyer advertising an offer in the physical store;

analyzing the image to extract an offer identifier; and requesting the condition corresponding to the offer identifier.

11. A computer program product comprising one or more non-transitory computer-readable storage devices, and program instructions stored on at least one of the one or more storage devices, the stored program instructions comprising program instructions for performing the steps:

scanning, by a sensor associated with a physical shopping cart, a first physical product placed in the physical shopping cart, the sensor in communication with a data processing apparatus associated with the physical shopping cart, the physical shopping cart located in a physical store;

identifying a first product identifier of the scanned first physical product;

querying a backend system with the product identifier, where the backend system stores an offer for a valid combination of products, the offer being available based on a condition of the physical store that requires the valid combination of products to be checked out together, the valid combination of products including the first physical product and at least a second physical product;

receiving, from the backend system in response to the querying, a second product identifier of the second physical product and an indication that the first physical product and the second physical product are included in the offer according to the condition that both the first physical product and the second physical product are to be checked out together;

causing the data processing apparatus coupled to the physical shopping cart to determine whether the second physical product has been scanned in the physical shopping cart;

responsive to determining that the second physical product has not been scanned in the physical shopping cart, obtaining a location of the second physical product in the physical store; and displaying information about the second physical product and information about the location of the second physical product in the physical store on a display device to a shopper using the shopping cart, the shopper being physically situated in the physical store.

12. The computer program product of claim 11, wherein identifying the first product identifier of the scanned first physical product comprises:

capturing, from the first physical product, a product input, the product input comprising an image of the first physical product; and analyzing the image to extract the first product identifier of the first physical product.

13. The computer program product of claim 11, wherein identifying the first product identifier of the scanned first physical product comprises:

capturing, from the first physical product, a product input, the product input comprising a transmission from a radio frequency identification (RFID) device associated with the first physical product; and analyzing the transmission to extract the first product identifier.

14. The computer program product of claim 13, where the stored program instructions further comprise program instructions for performing the step:

receiving, from a physical shopping cart, the product input corresponding to the first physical product, wherein the shopping cart is configured to identify products placed in the shopping cart, and wherein the selected product is physically placed in the shopping cart.

15. The computer program product of claim 11, where the stored program instructions further comprise program instructions for performing the steps:

determining a product preference of the shopper from a profile of the shopper;

querying a retailing backend system for information about a superset of products that are participating in a set of current offers; and disqualifying, from the superset of products, those products that fail to satisfy the product preference, the set of products remaining after the disregarding.

16. The computer program product of claim 15, where the stored program instructions further comprise program instructions for performing the steps:

determining that a first product in the superset and a second product in the superset form a first valid combination corresponding to the offer;

computing a combined characteristic of the first valid combination; and evaluating, as a part of the disqualifying, that the combined characteristic as failing to satisfy the condition.

17. The computer program product of claim 16, wherein a value of the combined characteristic exceeds a budget set in the product preference.

18. The computer program product of claim 11, where the stored program instructions further comprise program instructions for performing the steps:

detecting, using a second sensor, a presence of the shopper within the physical store; and establishing, responsive to the detecting, a communication path between the display device and a retailing backend system.

19. The computer program product of claim 11, where the stored program instructions further comprise program instructions for performing the step:

obtaining a layout of the store, wherein the displayed information about the location of the second physical product in the physical store comprises the layout of the store.

20. The computer program product of claim 11, where the stored program instructions further comprise program instructions for performing the steps:

capturing an offer input, the offer input comprising an image of a printed flyer advertising an offer in the physical store;

analyzing the image to extract an offer identifier; and requesting the condition corresponding to the offer identifier.

* * * * *